US006521029B1

(12) United States Patent
Matzdorf et al.

(10) Patent No.: US 6,521,029 B1
(45) Date of Patent: *Feb. 18, 2003

(54) PRETREATMENT FOR ALUMINUM AND ALUMINUM ALLOYS

(75) Inventors: Craig A Matzdorf, California, MD (US); James L. Green, III, Lusby, MD (US); Michael J. Kane, Callaway, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/116,844

(22) Filed: Apr. 5, 2002

Related U.S. Application Data

(63) Continuation-in-part of application No. 09/702,225, filed on Oct. 31, 2000, now Pat. No. 6,375,726.

(51) Int. Cl.$^7$ ................................................ C23C 22/05
(52) U.S. Cl. ................................ 106/14.44; 106/14.21; 106/14.41; 148/247; 148/275; 428/472; 428/472.1
(58) Field of Search ..................... 106/14.44, 14.21, 106/14.41; 148/247, 275; 428/472, 472.1

(56) References Cited

U.S. PATENT DOCUMENTS

| | | | | | |
|---|---|---|---|---|---|
| 3,539,403 A | * | 11/1970 | Ries | ............................ | 148/247 |
| 3,912,548 A | * | 10/1975 | Faigen | ....................... | 148/247 |
| 3,986,970 A | * | 10/1976 | Shiga | ........................ | 216/107 |
| 4,148,670 A | * | 4/1979 | Kelly | .......................... | 148/247 |
| 4,273,592 A | * | 6/1981 | Kelly | .......................... | 148/247 |
| 4,339,310 A | * | 7/1982 | Oda et al. | ................. | 106/14.12 |
| 4,921,552 A | * | 5/1990 | Sander et al. | ............... | 148/247 |
| 4,963,198 A | * | 10/1990 | Higgins | ...................... | 148/267 |
| 5,091,023 A | * | 2/1992 | Saeki et al. | ............... | 106/14.12 |
| 5,226,976 A | * | 7/1993 | Carlson et al. | ........... | 106/14.15 |
| 5,304,257 A | * | 4/1994 | Pearlstein et al. | ........... | 148/265 |
| 5,395,655 A | * | 3/1995 | Kazuyuki et al. | ........... | 148/251 |
| 6,375,726 B1 | * | 4/2002 | Matzdorf et al. | ......... | 106/14.21 |

* cited by examiner

Primary Examiner—Anthony J. Green
(74) Attorney, Agent, or Firm—Ron Billi

(57) ABSTRACT

Pretreated aluminum and aluminum alloys and the process for pretreating said aluminum substrates to improve its corrosion-resistance, and adhesion properties which comprises pretreating said aluminums with an effective amount of an acidic aqueous solution having a pH ranging from about 2.5 to 4.5 and comprises effective amounts of a trivalent chromium compound, alkali metal hexafluorozirconates, at least one alkali metal fluorocompound, and small but effective amounts of water soluble thickeners and/or surfactants.

20 Claims, 4 Drawing Sheets

TCP ON 2219-T87 AFTER 336 HOURS EXPOSURE TO NEUTRAL SALT FOG PER ASTM B 117

ALODINE 1200S ON 2219-T87 AFTER 336 HOURS EXPOSURE TO NEUTRAL SALT FOG PER ASTM B 117

TCP ON 2024-T3 AFTER 336 HOURS EXPOSURE TO NEUTRAL SALT FOG PER ASTM B 117

ALODINE 1200S ON 2024-T3 AFTER 336 HOURS EXPOSURE TO NEUTRAL SALT FOG PER ASTM B 117

TCP ON 7075-T6 AFTER 336 HOURS EXPOSURE
TO NEUTRAL SALT FOG PER ASTM B 117

ALODINE 1200S ON 7075-T6 AFTER 336 HOURS
EXPOSURE TO NEUTRAL SALT FOG PER ASTM B 117

TCP ON 5083-H131 AFTER 336 HOURS EXPOSURE TO NEUTRAL SALT FOG PER ASTM B 117

ALODINE 1200S ON 5083-H131 AFTER 336 HOURS EXPOSURE TO NEUTRAL SALT FOG PER ASTM B 117

PRETREATMENT FOR ALUMINUM AND ALUMINUM ALLOYS

This application is a continuation-in-part of co-pending application Ser. No. 09/702,225 filed Oct. 31, 2000 by Matzdorf et al., now U. S. Pat. No. 6,375,726 B1 issued Apr. 23, 2002.

BACKGROUND OF THE INVENTION

1. Field of the Invention

This invention relates to the protection and pretreatment of aluminum and aluminum alloys and to the surface treatment of aluminums with novel compositions and to the method of using these compositions for the pretreatment of aluminum and aluminum alloys at ambient temperatures. The pretreatment coatings provide improved corrosion resistance, adhesion of overlaying coatings e.g. paints etc., and maintains low electrical contact resistance in a corrosive environment. More specifically, this invention relates to a corrosion resistant composition and to the process of using the composition on aluminum and aluminum alloys which comprises an acidic aqueous solution containing effective amounts of at least one water soluble trivalent chromium salt, an alkali metal hexafluorozirconate, at least one fluoro-compound and at least one water soluble thickener and/or water soluble surfactant.

2. Description of Prior Art

It is the current practice to improve the corrosion resistance and bonding of subsequent coatings to aluminum and its alloys by initially coating or pretreating the metal surface with protective films. The coating enhances the corrosion resistance of the unpainted metal surface and prepares the surface for a finish coating such as paint etc. These conversion coatings are most often applied by the use of hexavalent chromium-containing solutions. While these coatings provide good corrosion resistance, attempts have been made to provide a more acceptable non-chromate derived coating because of the growing concern regarding the occupational safety, health and environmental effects of hexavalent chromium. Hexavalent chromium is highly toxic and is a known carcinogen. Therefore, the solutions used to deposit these protective films and the films per se are toxic carcinogenic. Chromate films, however, provide outstanding paint adhesion and corrosion resistance and are easy to apply by various methods including immersion, spraying or by the wipe-on technique. However, the environmental laws and OSH regulations are forcing the military and commercial users to find other non-toxic, non-chromate pretreatments. Moreover, the use of chromate conversion coatings is becoming more expensive as the regulations are being enforced and costs become prohibitive with the restrictions being imposed by the EPA In addition, certain processes like spraying chromate conversion coatings are forbidden because of OSH, thereby forcing the use of less than optimum alternative methods.

More specifically, it is known that aqueous chromate solutions contain chemicals that partially dissolve the surface of the metal and form insoluble films known as chromate conversion coatings or pretreatments. These coatings are corrosion resistant and protect the metal from various elements which cause corrosion. Although the conversion coatings enhance corrosion resistance and improve the paint bonding properties, the coatings have a serious drawback, i.e., the toxic nature of the solutions from which they are made and the presence of hexavalent chromium in the applied films. This is a serious problem from the standpoint of the operators handling the solution e.g. disposing the used chromate solution, the chromate-contaminated rinse water, and the coating systems contaminated with chromates. These problems, however, can be avoided by eliminating the hexavalent chromium from the process. However, this method is expensive and can be a major cost factor in the overall metal treating process. Therefore it is highly desirable to provide processes and protective coatings which are free of hexavalent chromium, but at the same time capable of imparting corrosion resistant and bonding properties which are comparable to those imparted by conventional chromate-based conversion coatings. Of particular interest is the use of chromate conversion coatings on aluminum and its alloys e.g. the coating of large objects such as aircraft. It would be desirable to provide a protective coating for aluminum and its alloys utilizing relatively non-toxic chemicals that could serve as an alternative to the toxic hexavalent chromium.

SUMMARY OF THE INVENTION

This invention relates to acidic aqueous trivalent chromium pretreatment (TCP) of aluminum and its alloys and to the process for improving the adhesion, and corrosion resistant properties of the aluminum substrates. Specifically, this invention relates to pretreating aluminum and to the process of pretreating aluminum substrates at ambient temperatures or higher e.g. temperatures ranging up to about 200° F. The pretreatment solutions comprises an acidic aqueous solution having a pH ranging from about 2.5 to 4.5 and preferably from 3.7 to 4.0, and contains per liter of said solution, from about 0.01 to 22 grams of a water-soluble trivalent chromium salt, about 0.01 to 12 grams of an alkali metal hexafluorozirconate, about 0.01 to 12 grams of at least one fluoro-compound selected from the group consisting of an alkali metal tetrafluorobroate, an alkali metal hexafluorosilicate and various combinations thereof, from about 0 to 10 grams per liter and preferably 0.5 to 1.5 grams of at least one water-soluble thickener, and from 0 to 10 grams per liter and preferably 0.5 to 1.5 grams of at least one water-soluble non-ionic, cationic or anionic surfactant.

It is therefore an object of this invention to provide pretreated aluminum and its alloys by treating said aluminums with an aqueous solution comprising a trivalent chromium salt, an alkali metal hexafluorozirconate, and effective amounts of a tetrafluoroborate and/or hexafluorosilicate to improve the electrical resistance, adhesion and corrosion resistance properties.

It is another object of this invention to provide a process of pretreating aluminum substrates with a stable acidic aqueous solution having a pH ranging from about 3.7 to 4.0 containing effective amounts of a trivalent chromium salt and hexafluorozirconate.

It is a further object of this invention to provide a stable acidic aqueous solution having good "shelf life" containing trivalent chromium salts, hexafluorozirconate, and a pH ranging from about 3.7 to 4.0 for pretreating aluminum substrates at ambient temperatures wherein said acidic pretreating solution contains substantially no hexavalent chromium.

These and other objects of the invention will become apparent by reference to the detailed description when considered in conjunction with the accompanying drawings.

DETAILED DESCRIPTION OF THE INVENTION

Figure 1:
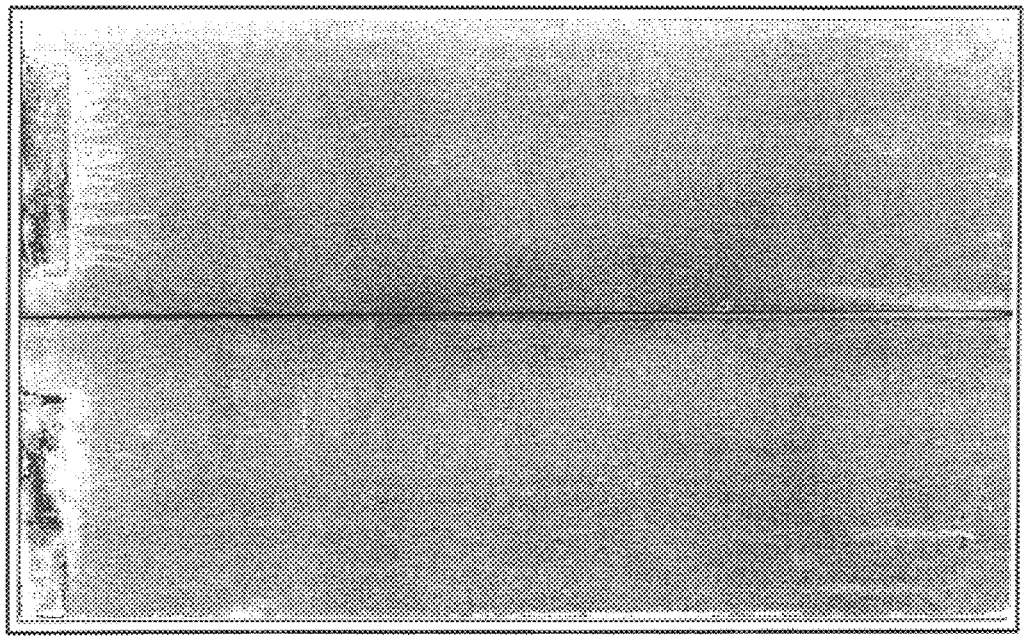
FIG. 1, photo shows TCP on 2219-T87 after 336 hours exposure to neutral salt fog per ASTM B-11.

This invention relates to an acidic, aqueous stable solution of trivalent chromium salts having a pH ranging from about 2.5 to 4.5 and preferably from 3.7 to 4.0 and the use thereof at ambient temperatures or higher for pretreating aluminum and aluminum alloys. The stable aqueous solutions comprise from about 0.01 to 22 grams, per liter of solution, and preferably about 0.01 to 10 grams per liter e.g. 5–7 grams of at least one water soluble trivalent chromium salt, about 0.01 to 12 grams and preferably about 0.01 to 8.0 grams e.g. 6–8 grams per liter of solution of at least one alkali metal hexafluorozirconate, about 0.01 to 12 grams and preferably from about 0.01 to 1.2 grams e.g. 0.05 to 0.36 grams of at least one alkali metal tetrafluoroborate, 0.01 to 1.2 grams e.g. 0.01 to 1.2 grams of an alkali metal hexafluorosilicate and any combinations thereof, from about 0.0 to 10 grams per liter of the solution and preferably from about 0.5 to 1.5 grams per liter of at least one water soluble thickener e.g. water soluble organic thickener, and from about 0.0 to 10 grams per liter and preferably 0.5 to 1.5 grams per liter of the solution of at least one water soluble surfactant or wetting agent selected from the group consisting of nonionic, cationic and anionic surfactants.

In some pretreatments, the alkali metal tetrafluoroborates and/or hexafluorosilicates can be added to the solution in amounts as low as 0.001 grams per liter up to the solubility limits of the compounds. For example, about 500% weight percent of the fluorosilicate is added based on the weight of the fluorozirconate. In other words, for 8 grams per liter of the fluorozirconate salt, about 4.0 grams per liter of fluorosilicate is added to the solution. An alternative is to add about 0.01 to 100 weight percent of the fluoroborate salt based on the weight of the fluorozirconate salt. Preferably, about 1 to 10 weight percent e.g. 3% of the fluoroborate salt can be added based on the weight of the fluorozirconate salt. An example comprises about 8 grams per liter of potassium hexafluorozirconate, about 6 grams per liter of chromium In sulfate basic, and about 0.24 to 0.36 grams per liter of potassium tetrafluoroborate. An important result of the addition of the stabilizing additives i.e. fluoroborates and/or fluorosilicates is that the solution is stable and the pH is maintained between about 3.7 and 4.0. However, in some cases the pretreatment solutions may require small adjustments to the pH by the addition of dilute acid or base to maintain the pH in the preferred range of about 3.7 to 4.0.

The trivalent chromium may be added to the solution as any water-soluble trivalent chromium compound, preferably as a trivalent chromium salt. Specifically, in formulating the aqueous coatings of this invention, the trivalent chromium is added conveniently to the solution in its water soluble form wherein the valence of the chromium is plus 3. The preferred chromium compounds are incorporated in the aqueous solution in the form of $Cr_2(SO_4)_3$, $(NH4)Cr(SO_4)_2$ or $KCr(SO_4)_2$ and various combinations of these compounds. A preferred trivalent chromium concentration is within the range of about 0.01 to 10 grams per liter of the aqueous solution and it has been found that particularly good results are obtained economically when the chromium is present in this preferred range. A preferred alkali metal fluorozirconate addition to the solution ranges from about 0.01 to 8.0 grams per liter.

The pretreatment, of the aluminums can be carried out at various temperatures including the temperature of the pretreatment solution which ranges from ambient e.g. about room temperature up to about 200° F. Room temperature treatment is preferred, however, in that this eliminates the necessity for heating equipment. The coating may be air dried by any of the methods known in the art, for example, oven drying, forced air drying, exposure to infra-red lamps, etc. For purposes of this invention, the term "aluminum" is intended to include substantially pure aluminum, and any aluminum alloy containing various other metals and particularly any aluminum alloys containing over 60% by weight aluminum.

The following Examples illustrate the stable pretreatment solutions of this invention and the method of using the solutions in preparing corrosion-resistant aluminum and aluminum alloys.

EXAMPLE 1

A stable acidic aqueous pretreating solution having a pH ranging from about 3.7 to 4.0 for pretreating aluminum and aluminum alloys to form a corrosion-resistant coating thereon comprises, per liter of solution, from about 6.0 grams of trivalent chromium sulfate, about 8.0 grams of potassium hexafluorozirconate, about 4.0 grams of an alkali metal hexafluorosilicate, about 4.0 grams of an alkali metal tetrafluoroborate, about 0.5 to 1.5 grams of a cellulose thickener and about 0.5 to 1.5 grams of a water soluble surfactant.

EXAMPLE 2

A stable acidic aqueous solution having a pH ranging from about 3.7 to 4.0 for pretreating aluminum and aluminum alloys to form a corrosion-resistant coating thereon comprises, per liter of solution, from about 0.01 to 10 grams of trivalent chromium sulfate, about 0.01 to 8.0 grams of sodium hexafluorozirconate, about 0.1 to 6.0 grams of an alkali metal tetrafluoroborate, about 0.1 to 6.0 grams of an alkali metal hexafluorosilicate and from about 0.5 to 1.5 grams of methylcellulose thickener.

EXAMPLE 3

A stable acidic aqueous solution for pretreating aluminum and aluminum alloys to form a corrosion-resistant coating thereon comprises, per liter of solution, from about 0.01 to 10 grams of trivalent potassium-chromium sulfate (KCr $(SO4)_2$), about 6 to 8 grams of potassium hexafluorozirconate, about 0.01 to 6.0 grams of an alkali metal hexafluorosilicate, about 0.01 to 6.0 grams of an alkali metal tetrafluoroborate, and from about 0.5 to 1.5 grams of methylcellulose thickener.

Prior to forming the trivalent chromium pretreatment, the aluminum substrates were treated by cleaning the aluminum for about 15 minutes at temperatures ranging from about 100° to 140° F. with an alkaline phosphate cleaner (Turco 4215), rinsed in tap water and subsequently immersed in a non-chromate deoxidizer (Turco Smut Go NC) for about 1.0 to 15 minutes under ambient conditions, and then rinsed again in ambient tap water. The cleaned substrates were then immersed in the acidic trivalent chromium sulfate solutions of this invention at ambient conditions for about 30 seconds to 60 minutes and subsequently rinsed in ambient tap water and let stand until dry. In an alternative process, the aluminum substrates were sprayed with (Turco 4215) for about 15 minutes at ambient temperatures then rinsed in cold tap water and sprayed with (Turco Smut Go NC) for about 30 seconds under ambient conditions. After a further water rinse, the cleaned substrates were sprayed with an acidic aqueous solution of trivalent chromium sulfate containing effective amounts of potassium hexafluorozirconate, an alkali metal tetrafluoroborate, and an alkali metal hexafluorosilicate at ambient temperatures and then rinsed.

Coating the aluminum substrates with the trivalent chromium solutions of this invention can be accomplished by spraying, wiping or immersing the aluminum substrate. The duration of contact ranges from about 30 seconds to about 5 minutes, but longer contact; e.g., up to sixty minutes or more, may be required where the trivalent chromium concentration or temperature of the (TCP) solution is relatively low. The aqueous solution temperature is normally below 100° C., e.g. in the range of 15° to 75° C. e.g. about 25° C. The aluminum temperatures ranges from about 150 to 30° C.

EXAMPLE 4

A pretreatment coating was applied to 3" by 10" by 0.32" aluminums 2024-T3, 7075-T6, 2219-T87, and 5083-H131 as follows. Immediately after cleaning and deoxidizing the aluminum panels by standard methods, the panels were rinsed thoroughly two times in deionized water. Immediately after rinsing, the panels were immersed into a 4-month old 9-gallon (TCP) solution of this invention (Example 2) for about 2 minutes at ambient conditions. The immersion was immediately followed by two deionized water rinses. The aluminum panels were air-dried at ambient conditions before being subjected to 336 hours of neutral salt fog per ASTM B 117. The panels were held in a rack at 6 degrees for the duration of the test. These aluminum panels were tested alongside MIL-C-81706 "controls" that consisted of aluminums that were pretreated by immersing in a prior art solution of Alodine 1200S, an industry-standard chromate pretreatment sold by the Henkel Co.

Figure 2:
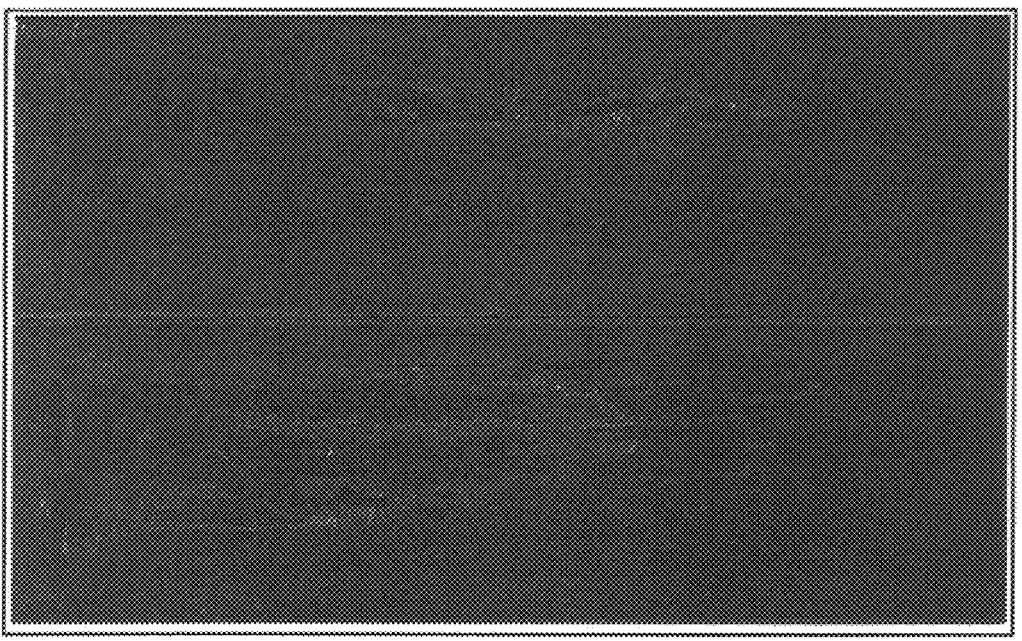
FIG. 2, photo shows Alodine 1200S on 2219-T87 after 336 hours exposure to neutral salt fog per ASTM B-117.
Figure 3:
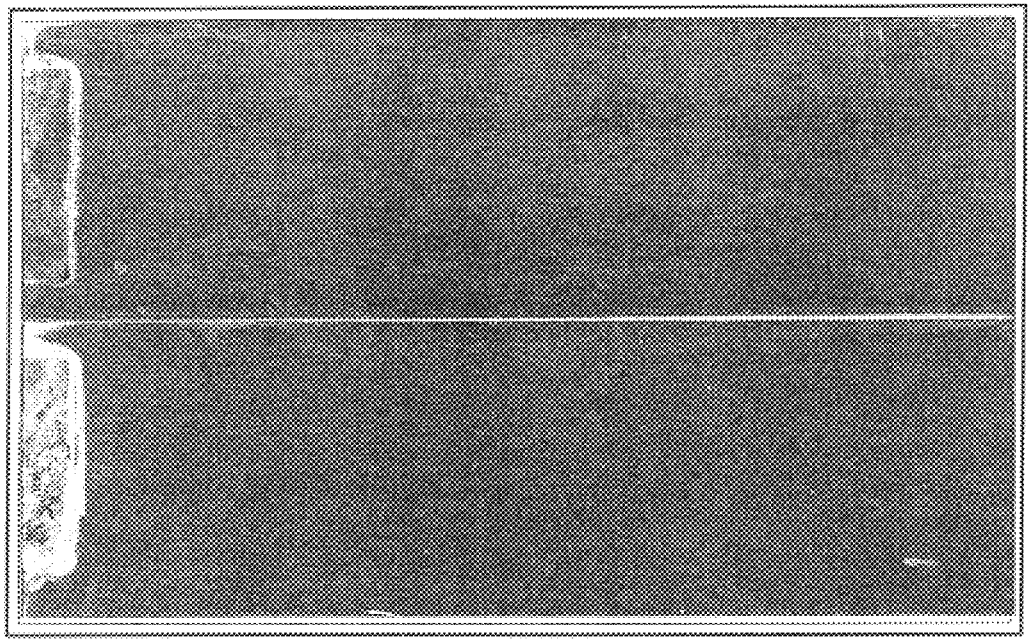
FIG. 3, photo shows TCP on 2024-T3 after 336 hours exposure to neutral salt fog per ASTM B-11.
Figure 4:
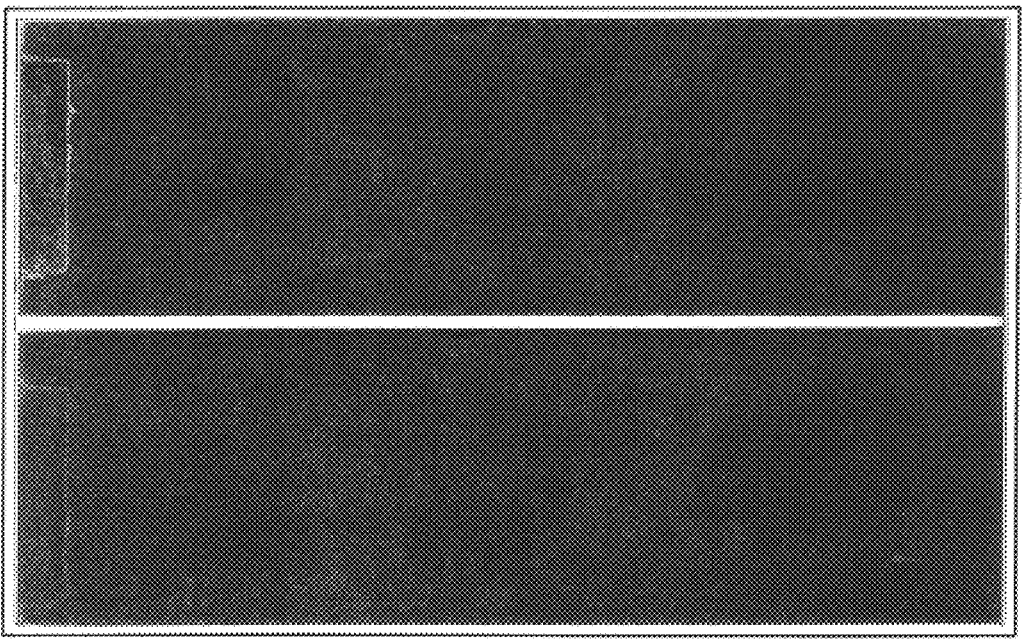
FIG. 4, photo shows Alodine 1200S on 2024T3 after 336 hours exposure to neutral salt fog per ASTM B-117.
Figure 5:
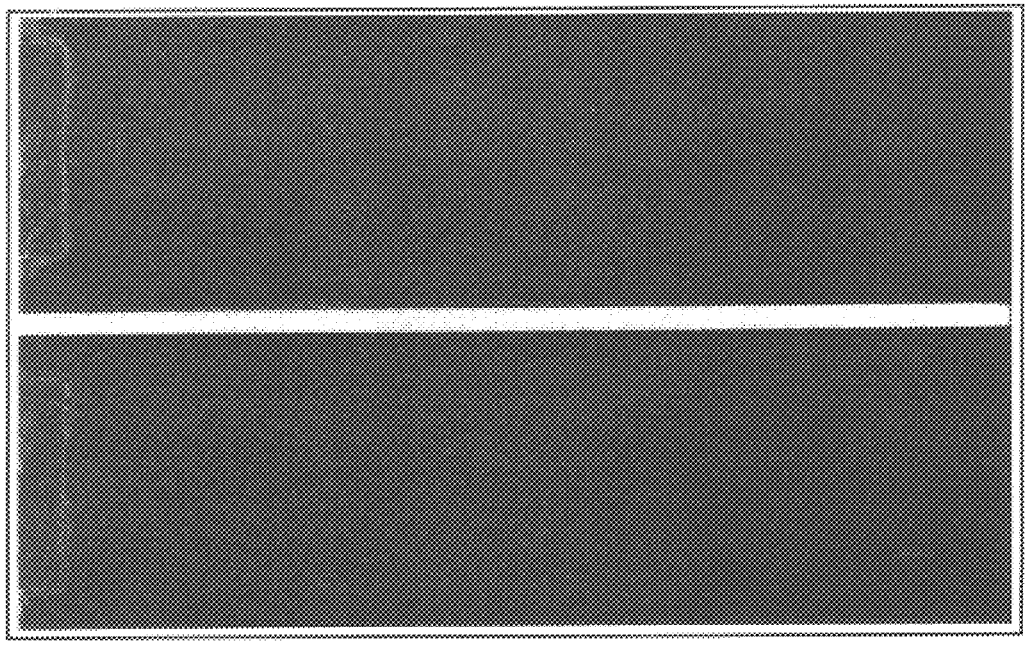
FIG. 5, photo shows TCP on 7075-T6 after 336 hours exposure to neutral salt fog per ASTM B-117.
Figure 6:
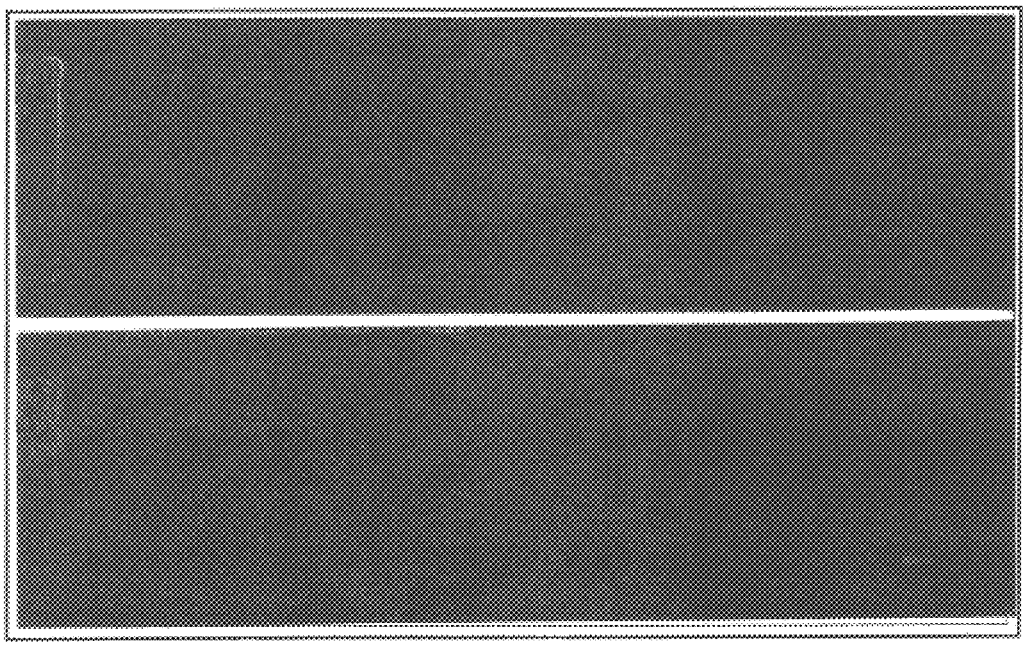
FIG. 6, photo shows Alodine 1200S on 7075-T6 after 336 hours exposure to neutral salt fog per ASTM B-117.
Figure 7:
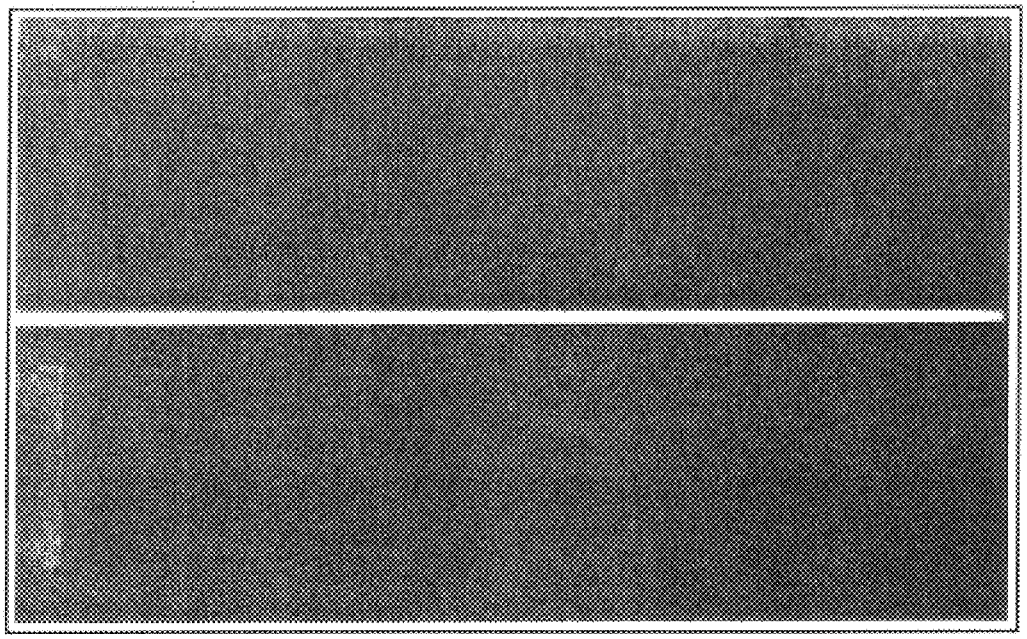
FIG. 7, photo shows TCP on 5083-H131 after 336 hours exposure to neutral salt fog per ASTM B-117.
Figure 8:
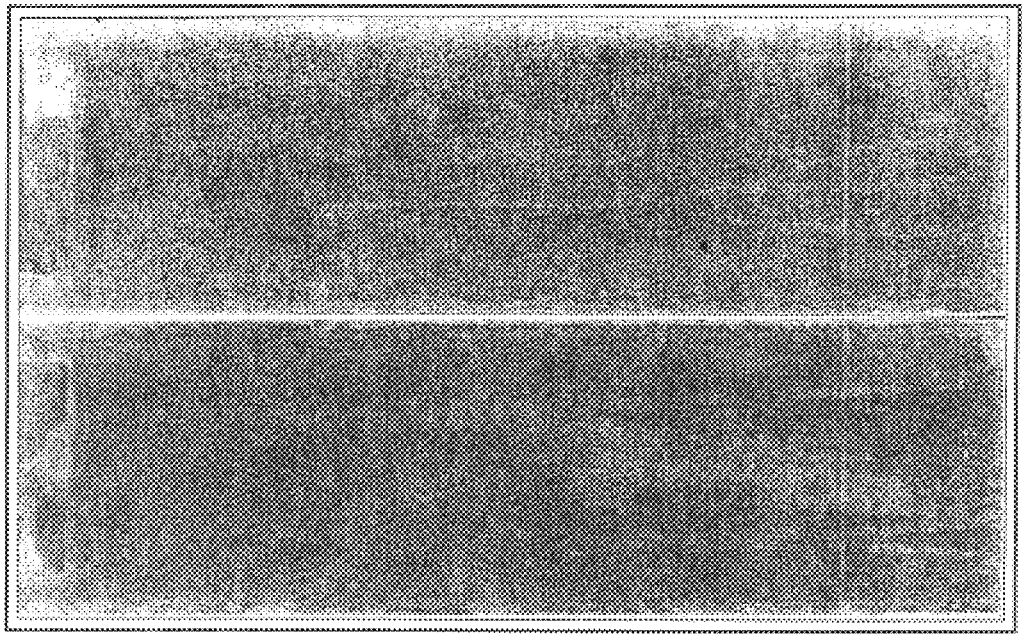
FIG. 8, photo shows Alodine 1200S on 5083-H131 after 336 hours exposure to neutral salt fog per ASTM B-117.

FIGS. 1–8, photos show the performance of TCP (Trivalent Chromium Pretreatment) of this invention compared to the chromate control (Alodine). As shown, TCP performs as well as the control in the 2-week neutral salt fog test for aluminums 2024, 7075 and 5083. TCP of this invention performed better than the chromate control on panel 2219.

EXAMPLE 5

Coating weights of TCP films deposited from the TCP compositions of this invention (Example 4) were determined by stripping the TCP coating from the aluminum panels per MIL-C-81706. In this method, the panels with the pretreatment were weighted and then immersed in a room temperature solution of 50% nitric acid for 5 minutes. After rinsing and air drying the panels are re-weighed. The resulting weight loss represents the weight of pretreatment applied to the aluminum panels. The immersion time in TCP was about 5 minutes.

In these examples, various amounts of potassium tetrafluoroborate were added to solutions containing about 6 grams per liter of chromium m sulfate basic and about 8 grams per liter of potassium hexafluorozirconate. In addition, about 1.0 gram per liter of Methocel F4M was added to one set of solutions to evaluate the impact of the thickener/surfactant on coating weights relative to the amount of potassium tetrafluoroborate. Table 1, documents the coating weights for each solution. The weight percent of potassium tetrafluoroborate is based on the amount of potassium hexafluorozirconate. For example, a 3% BF4 (tetrafluoroborate) solution with 8 grams per liter of potassium hexafluorozirconate means the solution contains about 0.24 grams per liter of potassium tetrafluoroborate. As shown in Table 1, the thickener lowers the coating weight in all cases by about 5%. In addition, the amount of KBF4 (potassium tetrafluoroborate) has an inverse relationship.to concentration. This correlates with the corrosion performance of panels with these coatings where the panels prepared from the lowest amount of KBF4 in the composition were the best. Corrosion performance decreased with increasing amounts of KBF4. Solution stability, however is opposite. The higher amounts of KBF4 are more stable and stability decreased with decreases in KBF4 concentration. These tradeoffs find that the use of the 3% KBF4 composition is the most favorable.

TABLE I

Coating Weights in mg/square foot with 5 minute immersion in TCP

| % BF4 | Coating Weight with 0.1% Methocel F4M | Coating Weight without Methocel F4M |
| --- | --- | --- |
| 2.5 | 33.60 | 34.56 |
| 3.0 | 31.20 | 32.64 |
| 4.0 | 29.28 | 31.68 |

EXAMPLE 6

Coating weights of TCP solutions of this invention were determined for 10 compositions with varying amounts of chromium III sulfate basic and potassium hexafluorozirconate while holding the relative concentration of potassium tetrafluoroborate fixed compared to potassium hexafluorozirconate. In this example, 2024-T6 aluminum panels were immersed in the TCP solutions for 5 minutes. Table 2 describes the average of two coating weights measured for coatings produced from each these solutions. As shown, there is a large increase in coating weight between the 1.2 and 3.0 gram per liter chromium III sulfate basic compositions. All solutions were within the optimum pH deposition range of 3.7 to 4.0. In addition, all solutions were chemically stable showing no precipitation or surface film formation after 2 weeks. This showing is typical of TCP compositions (solutions of this invention) without the KBF4 additive or solutions that have not had the pH manipulated.

TABLE 2

Coating Weights in mg/square foot for varying amounts of chromium III sulfate basic and potassium hexafluorozirconate.

| Concentration of chromium III sulfate basic (g/l) | Concentration of potassium hexafluorozirconate (g/l) | Concentration of potassium tetrafluoroborate (w % of KZrF) | Concentration of potassium tetrafluoroborate (g/l) | Coating Weight (mg/sq. ft) |
|---|---|---|---|---|
| 0.6 | 0.8 | 3.0 | 0.024 | 22.32 |
| 1.2 | 1.6 | 3.0 | 0.048 | 23.04 |
| 3.0 | 4.0 | 3.0 | 0.12 | 33.36 |
| 6.0 | 8.0 | 3.0 | 0.24 | 33.84 |

EXAMPLE 7

The adhesion of a variety of military specified primers was evaluated on TCP coatings of this invention that were deposited from a 5 month old 9-gallon immersion bath with TCP solutions where the concentration of chromium m sulfate basic was about 6.0 grams per liter and the concentration of potassium hexafluorozirconate was about 8.0 grams per liter. Aluminum panels were prepared as usual with an immersion time in the TCP solution of about two minutes. Adhesion of primers to TCP coatings was evaluated against Alodine 1200S, a chromate conversion coating per MIL-C-81706, and against no pretreatment. Adhesion tests were based on a modified version of Federal Standard 141C. Ratings are per ASTM D-3359. The modified method consists of a 1 day "wet" tape adhesion test where the test panel is immersed in deionized water at ambient condition before scribing and testing, a four-day immersion in 120° F. deionized water, and a seven-day immersion in 150° F. water. Ratings are based on a scale of 1 to 5, with 5 being the best rating.

Table 3 details the results of these paint adhesion tests. TCP coatings of this invention provided adhesion performance equivalent to the chromate controls for all the aluminum alloys and primers tested. Adhesion for TCP and the chromate controls is superior to no pretreatment.

For purposes of this invention, the water soluble surfactants are used in amounts ranging from about 0.0 to about 10 grams per liter and preferably about 0. 5 to 1. 5 grams per liter of the TCP solution. The surfactants are added to the aqueous solutions to provide better wetting properties by lowering the surface tension thereby insuring complete coverage, and a more uniform coating on the substrate. The surfactants include at least one water soluble compound selected from the group consisting of the non-ionic, anionic, and cationic surfactants. Specific water soluble surfactants include the monocarboxyl imidoazoline, alkyl sulfate sodium salts (DUPONOL®, tridecyloxy poly(alkyleneoxy ethanol), ethoxylated or propoxylated alkyl phenol (IGEPAL®), alkyl sulfoamides, alkaryl sulfonates, palmitic alkanol amides (CENTROL®), octylphenyl polyethoxy ethanol (TRITON®), sorbitan monopalmitate (SPAN®), dodecylphenyl polyethylene glycol ether (e.g. TERGITROL®), alkyl pyrrolidone, polyalkoxylated fatty acid esters, alkylbenzene sulfonates and mixtures thereof Other known water soluble surfactants are disclosed by "Surfactants and Detersive Systems", published by John Wiley & Sons in Kirk-Othmer's Encyclopedia of Chemical Technology, $3^{rd}$ Ed.

Where large surfaces or substrates do not permit immersion or where vertical surfaces are to be sprayed, thickening agents can be used to retain the aqueous solutions on the

TABLE 3

Paint Adhesion of TCP Compared to Alodine 1200S with no pretreatment

| Alloy | Primer | 1-day Wet Tape Adhesion | | | 4-day Wet Tape Adhesion | | | 7-day Wet Tape Adhesion | | |
|---|---|---|---|---|---|---|---|---|---|---|
| | | No pretreat | TCP | Alodine 1200s | No pretreat | TCP | Alodine 1220S | No pretreat | TCP | Alodine 1200S |
| 2024-T3 | Mil-PRF-23377 | 5 | 5 | 5 | 3 | 5 | 5 | 5 | 5 | 5 |
| 7075-T6 | | 2 | 5 | 5 | 5 | 5 | 5 | 5 | 5 | 5 |
| 5083-H131 | | 2 | 5 | 5 | 5 | 5 | 5 | 5 | 5 | 5 |
| 2024-T3 | Mil-PRF-85592 C1 | 5 | 5 | 5 | 5 | 5 | 5 | 5 | 5 | 5 |
| 7075-T6 | | 5 | 5 | 5 | 5 | 5 | 5 | 5 | 5 | 5 |
| 5083-H131 | | 0 | 5 | 5 | 3 | 5 | 5 | 2 | 5 | 5 |
| 2024-T3 | Mil-PRF-85582 NC | 5 | 5 | 5 | 4 | 5 | 5 | 1 | 5 | 5 |
| 7075-T6 | | 5 | 5 | 5 | 5 | 5 | 5 | 5 | 5 | 5 |
| 5083-H131 | | 4 | 5 | 5 | 3 | 5 | 5 | 1 | 5 | 5 | surface for sufficient contact time. The thickeners employed are known water soluble or dispersible thickeners which can be added to the trivalent chromium solution of this invention in amounts ranging from about 0.0 and about 10 grams per liter and preferably from about 0.5 to 1.5 grams per liter of the solution. Specific examples of these additives include the preferred cellulose thickeners e.g. hydroxypropyl cellulose (e.g. Klucel), ethyl cellulose, hydroxyethyl cellulose, hydroxymethyl cellulose, methyl cellulose, and some of the other water soluble thickeners such as colloidal silica, clays such as bentonite, starches, colloidal alumina, gum arabic, tragacanth, agar and any combination thereof While this invention has been described by a number of specific examples, it is obvious that there are other variations and modifications which can be made without departing from the spirit and scope of the invention as particularly set forth in the appended claims.

What is claimed is:

1. A process for pretreating aluminum and alloys of aluminum to improve the corrosion-resistance, and adhesion properties which comprises treating said aluminum and alloys of aluminum with an acidic aqueous solution having a pH ranging from about 2.5 to 4.5 and comprises, per liter of said solution, from about 0.01 to 22 grams of a water soluble trivalent chromium compound, about 0.01 to 12 grams of an alkali metal hexafluorozirconate, about 0.01 to 12 grams of at least one fluoro-compound selected from the group consisting of alkali metal tetrafluoroborates, alkali metal hexafluorosilicates and mixtures thereof, from 0 to 10 grams of at least one water soluble thickener and 0 to 10 grams of at least one water soluble surfactant.

2. The process of claim 1 wherein the pH of the aqueous solution ranges from about 3.7 to 4.0 and the temperature of the aqueous solution ranges from about room temperature to about 200° F.

3. The process of claim 2 wherein the trivalent chromium compound ranges from about 0.01 to 10 grams, the hexafluorozirconate ranges from about 0.01 to 8 grams, and the tetrafluoroborate ranges from about 0.01 to 1.2 grams.

4. The process of claim 3 wherein the thicker is a cellulose compound ranging from 0.5 to 1.5 grams.

5. The process of claim 4 wherein the surfactant is nonionic and ranges from about 0.5 to 1.5 grams.

6. A process for pretreating, aluminum and alloys of aluminum to improve the corrosion-resistance, and adhesion properties which comprises treating said aluminum and alloys of aluminum with an aqueous solution having a pH ranging from about 3.7 to 4.0 and comprises per liter of solution from about 5.0 to 7.0 grams of a water soluble trivalent chromium salt, about 6.0 to 8.0 grams of an alkali metal hexafluorozirconate, and about 0.01 to 1.2 grams of at least one fluoro-compound selected from the group consisting of alkali metal tetrafluoroborates, alkali metal hexafluorosilicates and mixtures thereof.

7. The process of claim 6 wherein the tetrafluoroborate is present in the solution in an amount ranging from about 0.05 to 0.36 grams.

8. The process of claim 6 wherein about 0.5 to 1.5 grams of a cellulose thickener is added to the pretreatment solution.

9. The process of claim 6 wherein the chromium salt is trivalent chromium sulfate.

10. The process of claim 9 wherein the alkali metal zirconate is potassium hexafluorozirconate.

11. Pretreated aluminum and alloys of aluminum having improved corrosion-resistance, and adhesion properties comprising said aluminum and alloys of aluminum treated with a coating amount of an acidic aqueous solution having a pH ranging from about 2.5 to 4.5 and comprising per liter of said solution about 0.01 to 22 grams of a water-soluble trivalent chromium compound, from about 0.01 to 12 grams of an alkali metal hexafluorozirconate, about 0.01 to 12 grams of at least one fluoro-compound selected from the group consisting of an alkali metal tetrafluoroborate, an alkali metal hexafluorosilicate and mixtures thereof, from 0 to 10 grams of at least one water soluble thickener and from 0 to 10 grams of at least one water soluble surfactant.

12. The pretreated aluminums of claim 11 wherein the pH of the aqueous solution ranges from about 3.7 to 4.0.

13. The pretreated aluminums of claim 12 wherein the trivalent chromium compound ranges from about 0.01 to 10 grams, the hexafluorozirconate ranges from about 0.01 to 8.0 grams, and the tetrafluoroborate ranges from about 0.01 to 1.2 grams.

14. The pretreated aluminums of claim 13 wherein the thickener ranges from about 0.5 to 1.5 grams.

15. The pretreated aluminums of claim 14 wherein the surfactant ranges from about 0.5 to 1.5 grams.

16. Pretreated aluminums and alloys of aluminum having improved corrosion-resistance and adhesion properties comprising said aluminum and alloys of aluminum treated with a coating amount of an acidic aqueous solution having a pH ranging from about 3.7 to 4.0, and containing per liter of said solution from about 0.01 to 10 grams of a water soluble trivalent chromium salt, about 0.01 to 8 grams of an alkali metal hexafluorozirconate, about 0.01 to 1.2 grams of at least one fluoro-compound selected from the group consisting of an alkali metal tetrafluoroborate, an alkali metal hexafluorosilicate and mixtures thereof, from 0 to 10 grams of at least one water soluble thickener and from 0 to 10 grams of at least one water soluble surfactant.

17. The pretreated aluminums of claim 16 wherein the tetrafluoroborate is present in the solution in an amount ranging from about 0.05 to 0.36 grams.

18. The pretreated aluminums of claim 16 wherein about 0.5 to 1.5 grams of a cellulose thickener is present in the solution.

19. The pretreated aluminums of claim 16 wherein the chromium salt is trivalent chromium sulfate.

20. The pretreated aluminums of claim 16 wherein the alkali metal zirconate is potassium hexafluorozirconate.

* * * * *